United States Patent
Panchal

(10) Patent No.: US 9,438,383 B2
(45) Date of Patent: Sep. 6, 2016

(54) RESOLVING FALSELY DECODED ACKNOWLEDGMENTS

(71) Applicant: Verizon Patent and Licensing Inc., Basking Ridge, NJ (US)

(72) Inventor: Jignesh S. Panchal, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 14/256,533

(22) Filed: Apr. 18, 2014

(65) Prior Publication Data

US 2015/0305015 A1 Oct. 22, 2015

(51) Int. Cl.
*H04L 1/16* (2006.01)
*H04L 1/12* (2006.01)

(52) U.S. Cl.
CPC ....... *H04L 1/1671* (2013.01); *H04L 2001/125* (2013.01)

(58) Field of Classification Search
CPC .... H04L 1/18; H04L 1/1812; H04W 72/121; H04W 72/042
See application file for complete search history.

(56) References Cited

U.S. PATENT DOCUMENTS

| | | | | |
|---|---|---|---|---|
| 8,401,121 | B1* | 3/2013 | Ozgur | H04L 25/067 375/329 |
| 2002/0159412 | A1* | 10/2002 | Odenwalder | H04L 1/003 370/335 |
| 2008/0225783 | A1* | 9/2008 | Wang | H04W 72/042 370/329 |
| 2008/0320356 | A1* | 12/2008 | Tokita | H04L 1/1867 714/749 |
| 2010/0077272 | A1* | 3/2010 | Peisa | H04L 1/08 714/748 |
| 2013/0010587 | A1* | 1/2013 | Abrahamsson | H04L 1/1864 370/216 |
| 2014/0064248 | A1* | 3/2014 | Hultell | H04W 52/241 370/331 |
| 2015/0296059 | A1* | 10/2015 | Karri | H04L 69/324 370/329 |

OTHER PUBLICATIONS

3GPP, "Evolved Universal Terrestrial Radio Access (E-UTRA) and Evolved Universal Terrestrial Radio Access Network (E-UTRAN); Overall description; Stage 2 (Release 8)", 3rd Generation Partnership Project; Technical Specification Group Radio Access Network;, 3GPP TS 36.300 V8.3.0, Technical Specification, Dec. 2007, 120 pages.

* cited by examiner

*Primary Examiner* — Scott M Sciacca

(57) ABSTRACT

A device is configured to transmit uplink data to a base station using a resource. The device may receive an acknowledgment from the base station based on the uplink data. The acknowledgment may indicate a positive acknowledgment or a negative acknowledgment. The device may decode the acknowledgment as the positive acknowledgment or the negative acknowledgment. The device may receive a control message from the base station indicating resource assignments for user devices. The device may determine the acknowledgement is falsely decoded as the positive acknowledgment or the negative acknowledgment based on the resource assignments. The device may selectively retransmit the uplink data to the base station using the resource based on whether the acknowledgment is falsely decoded as the positive acknowledgment or the negative acknowledgment.

20 Claims, 9 Drawing Sheets

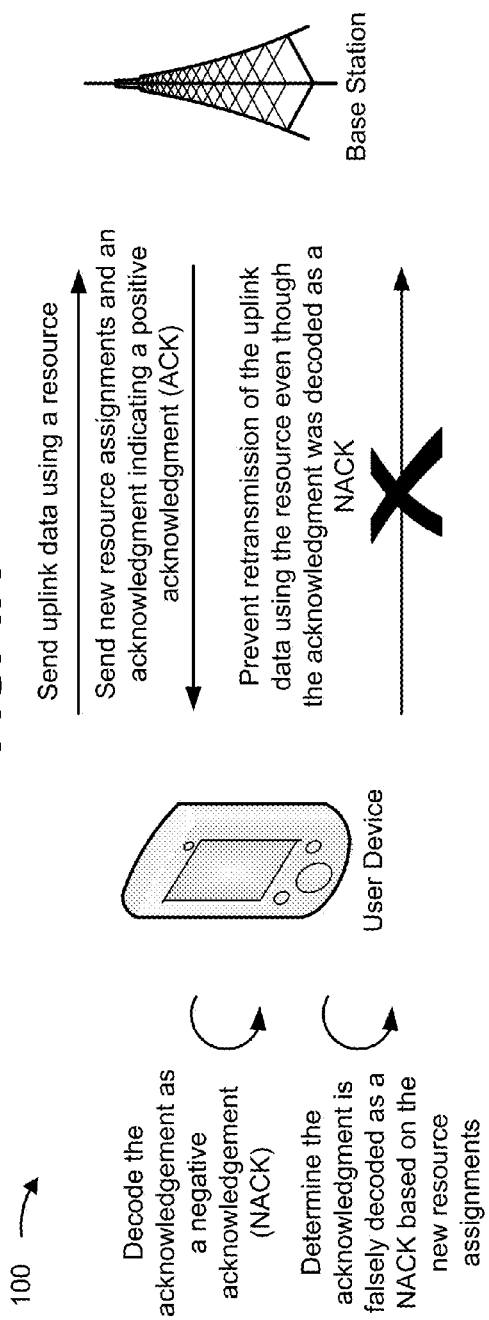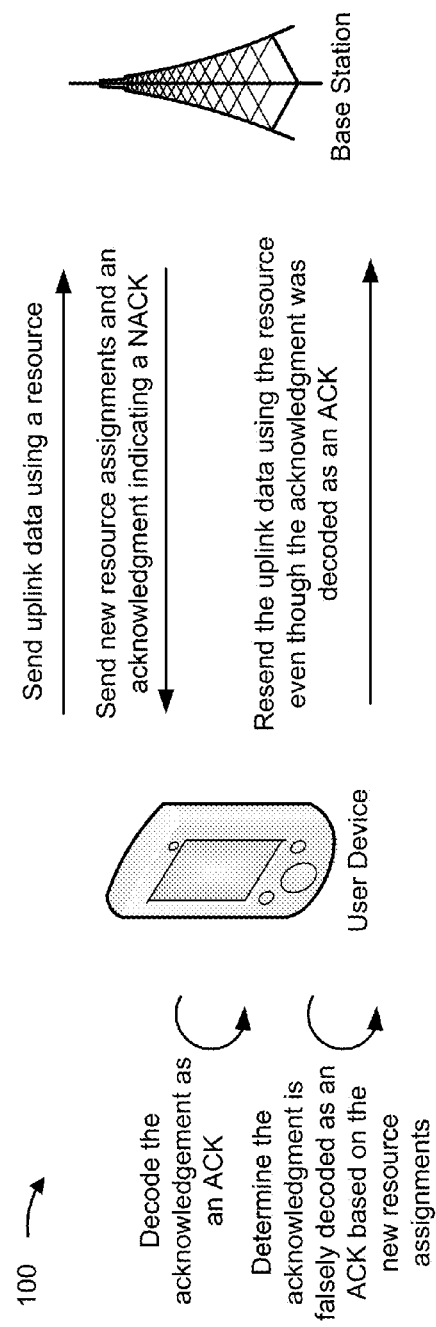

RESOLVING FALSELY DECODED ACKNOWLEDGMENTS

BACKGROUND

In Long Term Evolution (LTE) networks, a user device may use an assigned shared channel resource (herein referred to as a "resource") to send uplink data to an enodeB (eNB). The eNB may receive the uplink data, decode the uplink data, and send an acknowledgment to the user device indicating whether the uplink data could be properly decoded. The user device may receive the acknowledgment and decode the acknowledgment. If the decoded acknowledgment indicates a positive acknowledgment (ACK), the user device may continue to send new uplink data using a newly assigned resource. However, if the decoded acknowledgment indicates a negative acknowledgement (NACK), the user device may retransmit the same uplink data using the same resource.

BRIEF DESCRIPTION OF THE DRAWINGS

FIGS. 1A and 1B are diagrams of an overview of an example implementation described herein;

DETAILED DESCRIPTION OF PREFERRED EMBODIMENTS

Figure 2:
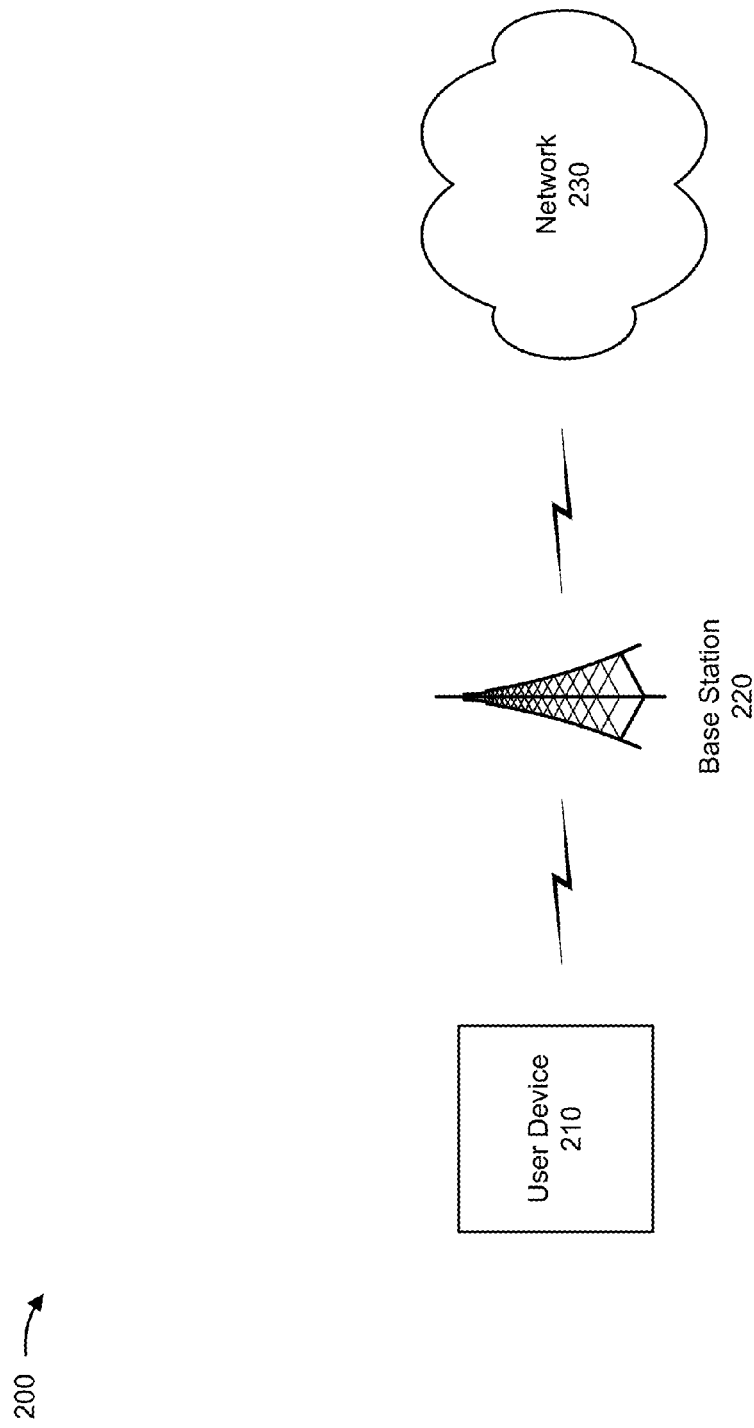
FIG. 2 is a diagram of an example environment in which systems and/or methods, described herein, may be implemented.

The following detailed description of example implementations refers to the accompanying drawings. The same reference numbers in different drawings may identify the same or similar elements.

In LTE networks, an eNB may assign resources to multiple user devices (e.g., smart phones, tablet computers, etc.) and send control information to the user devices indicating which resources (e.g., frequencies) are assigned to which user device. There may be a finite number of resources available and the resources may be continually reassigned to different user devices. For example, after an eNB properly decodes uplink data and sends an ACK to a user device, the eNB may reassign the resource to another user device to use. On the other hand, after an eNB fails to properly decode uplink data and sends a NACK, the eNB may implicitly grant the user device the ability to resend the uplink data using the resource. Accordingly, the eNB may wait for the user device to resend the uplink data using the resource and may not reassign the resource to another user device to use.

However, problems may arise when the user device and the eNB become out of sync due to the user device falsely decoding an acknowledgment sent by the eNB. For instance, the user device may falsely decode an ACK as a NACK, or falsely decode a NACK as an ACK.

For example, the eNB may send an ACK to a first user device, but the first user device may falsely decode the ACK as a NACK. In such a case, the eNB may reassign the resource to a second user device to use and is not expecting the first user device to use the resource again. In some cases, the eNB may divide the resource and reassign the resource to multiple user devices. However, because the first user device falsely decoded the ACK as a NACK, the first user device may determine that the base station implicitly granted the first user device the ability to retransmit the uplink data using the resource. Accordingly, the first user device may use the resource to retransmit the uplink data to the eNB at the same time the second user device (or other user devices if the resource was divided) uses the resource to transmit other uplink data to the eNB. The transmissions from the first and second user devices may collide preventing the eNB from properly decoding any of the uplink data sent via the resource. Accordingly, no uplink data is properly transmitted during this time and the resource goes to waste. Consequently, the eNB may send NACKs until the user devices exhaust all retransmission opportunities (e.g., 7 retransmission opportunities in LTE).

Additionally, or alternatively, the eNB may send a NACK to the first user device, but the first user device may falsely decode the NACK as an ACK. In such a case, the eNB may not reassign the resource to the second user device. Rather, the eNB may implicitly grant the first user device the ability to retransmit uplink data using the resource. Accordingly, the eNB may keep the resource reserved for the first user device and wait for the first user device to resend the uplink data via the resource until all retransmission opportunities are exhausted. However, because the first user device falsely decoded the NACK as an ACK, the first user device may not be triggered to retransmit the uplink data and, consequently, may not retransmit the uplink data. Thus, the resource is wasted by the eNB waiting for a retransmission of the uplink data that never comes.

Moreover, the uplink data may never properly be received by the eNB and may cause a permanent gap or hole in a Media Access Control (MAC) layer data transmission sequence unless there is upper layer retransmission procedure (e.g., Radio Link Control (RLC) layer retransmission support). However, the upper layer retransmission procedure may be turned off by design or otherwise. For example, in Voice over LTE (VoLTE) service, the RLC layer retransmission is turned off by design and falsely decoding a NACK as an ACK may result in degraded voice quality due to packet loss.

Implementations described herein may resolve falsely decoded acknowledgments so that a user device and a base station remain in synch even though the user device falsely decoded an acknowledgment sent by the base station. Additionally, or alternatively, implementations described herein may prevent resources from being wasted due to a user device falsely decoding an acknowledgment sent by a base station.

FIGS. 1A and 1B are diagrams of an overview of an example implementation 100 described herein. In example implementation 100, assume a base station (e.g., an eNB) assigns resources (e.g., time-frequencies) to multiple user devices to use to communicate with the base station. Further, assume the base station sends resource assignments indicating the assigned resources to the user devices. Moreover, assume a user device receives the resource assignments and determines a resource assigned to the user device based on the resource assignments.

As shown in FIG. 1A, the user device may send uplink data to the base station using the resource. Assume, the base station receives the uplink data and properly decodes the uplink data. Consequently, the base station may send an acknowledgment indicating an ACK to the user device based on properly decoding the uplink data. Further, assume the base station creates new resource assignments for the user devices and sends the new resource assignments to the user devices.

The user device may receive the acknowledgment indicating the ACK, but falsely decode the acknowledgment as a NACK. Thus, the user device may determine that the user device is implicitly granted permission to retransmit the uplink data to the base station using the resource. The user device may also receive the new resource assignments for the user devices. The user device may check the new resource assignments (and/or past resource assignments) to determine whether the resource assignments are consistent with the user device just having received a NACK.

Assume the user device determines the resource assignments are not consistent with the user device just having received a NACK. Thus, the user device may determine the acknowledgment was falsely decoded as a NACK and that an ACK was actually received. Accordingly, the user device may prevent retransmission of the uplink data using the resource even though the user device decoded the acknowledgment as a NACK.

In this way, uplink transmission collision due to an unauthorized retransmission via the resource may be avoided and the resource may not be wasted.

As shown in FIG. 1B, the user device may send uplink data to the base station using a resource. Assume the base station receives the uplink data but does not properly decode the uplink data. Consequently, the base station may send an acknowledgment indicating a NACK to the user device based on not properly decoding the uplink data. Further, assume the base station creates new resource assignments for the user devices and sends the new resource assignments to the user devices.

The eNB may transmit the acknowledgment indicating the NACK, by the user device may falsely decode the acknowledgment as an ACK. Thus, the user device may determine that the uplink data does not need to be retransmitted. The user device may also receive the new resource assignments for the user devices. The user device may check the new resource assignments (and/or past resource assignments) to determine whether the resource assignments are consistent with the user device just having received an ACK.

Assume the user device determines the resource assignments are not consistent with the user device just having received an ACK. Thus, the user device may determine the acknowledgment was falsely decoded as an ACK and that a NACK was actually received. Accordingly, the user device may retransmit the uplink data using the resource even though the user device decoded the acknowledgment as an ACK.

In this way, the resource is not wasted by the base station waiting for a retransmission via the resource that never comes.

FIG. 2 is a diagram of an example environment 200 in which systems and/or methods, described herein, may be implemented. As shown in FIG. 2, environment 200 may include a user device 210, a base station 220, and/or a network 230. Devices of environment 200 may interconnect via wired connections, wireless connections, or a combination of wired and wireless connections.

User device 210 may include a device capable of receiving, processing, and/or providing information. For example, user device 210 may include a mobile phone (e.g., a smart phone, a radiotelephone, etc.), a computing device (e.g., a laptop computer, a tablet computer, a handheld computer, a gaming device, etc.), or a similar device. In some implementations, user device 210 may include a communication interface that allows user device 210 to receive information from and/or transmit information to another device in environment 200.

Base station 220 may include one or more network devices that receive, process, and/or transmit traffic, such as audio, video, text, and/or other data, destined for and/or received from user device 210. In some implementations, base station 220 may be an eNB device and may be part of a LTE network. Base station 220 may receive traffic from and/or send traffic to network 230. Base station 220 may send traffic to and/or receive traffic from user device 210 via an air interface.

Network 230 may include one or more wired and/or wireless networks. For example, network 230 may include a cellular network, a public land mobile network (PLMN), a second generation (2G) network, a third generation (3G) network, a fourth generation (4G) network, a fifth generation (5G) network, and/or another type of network. In some implementations, network 230 may include an evolved packet system (EPS) that includes a LTE network and/or an evolved packet core (EPC) that operate based on a third generation partnership project (3GPP) wireless communication standard. The LTE network may be a radio access network (RAN) that includes one or more base stations 220 via which user device 210 communicates with the EPC. Additionally, or alternatively, network 230 may include a wide area network (WAN), a metropolitan network (MAN), a telephone network (e.g., the Public Switched Telephone Network (PSTN)), an ad hoc network, an intranet, the Internet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
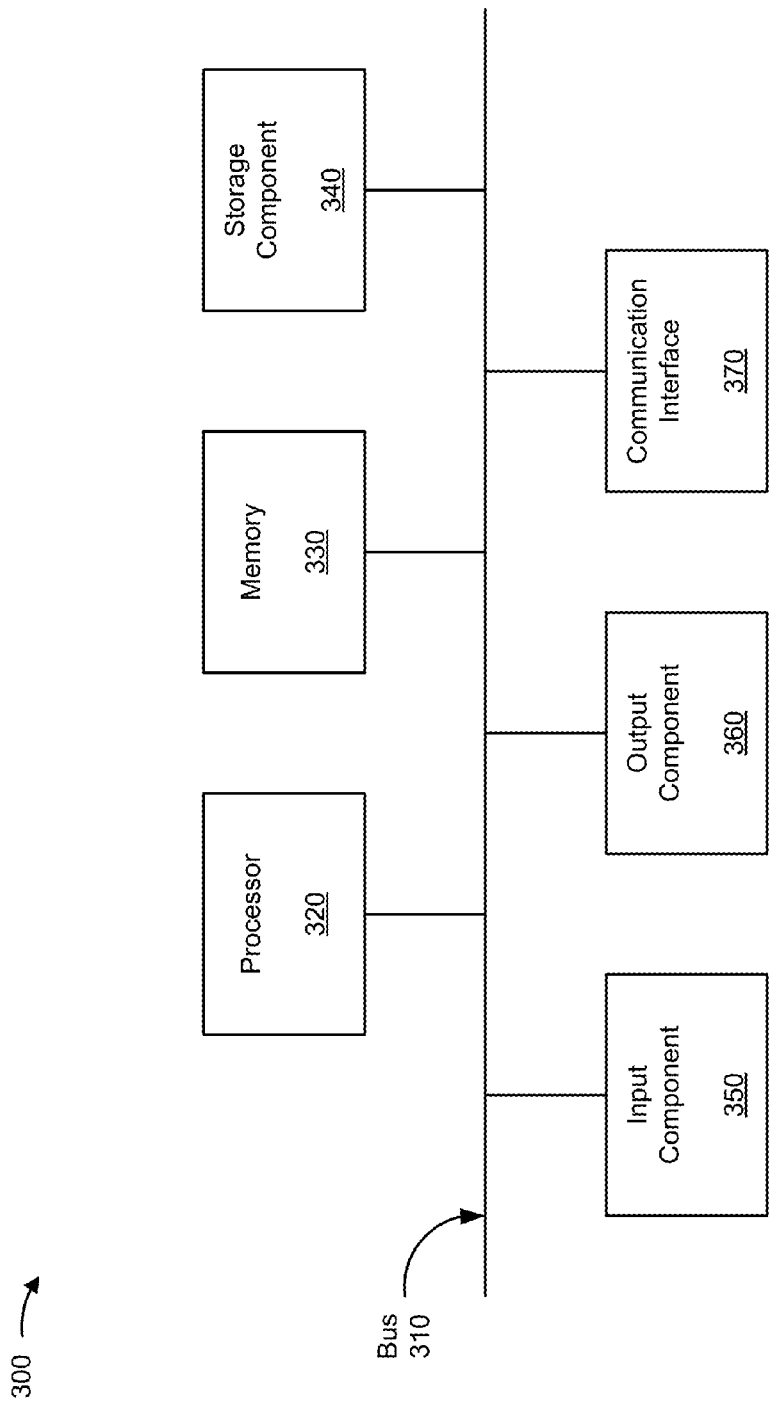
FIG. 3 is a diagram of example components of one or more devices of FIG. 2.

FIG. 3 is a diagram of example components of a device 300. Device 300 may correspond to user device 210 and/or base station 220. In some implementations, user device 210 and/or base station 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
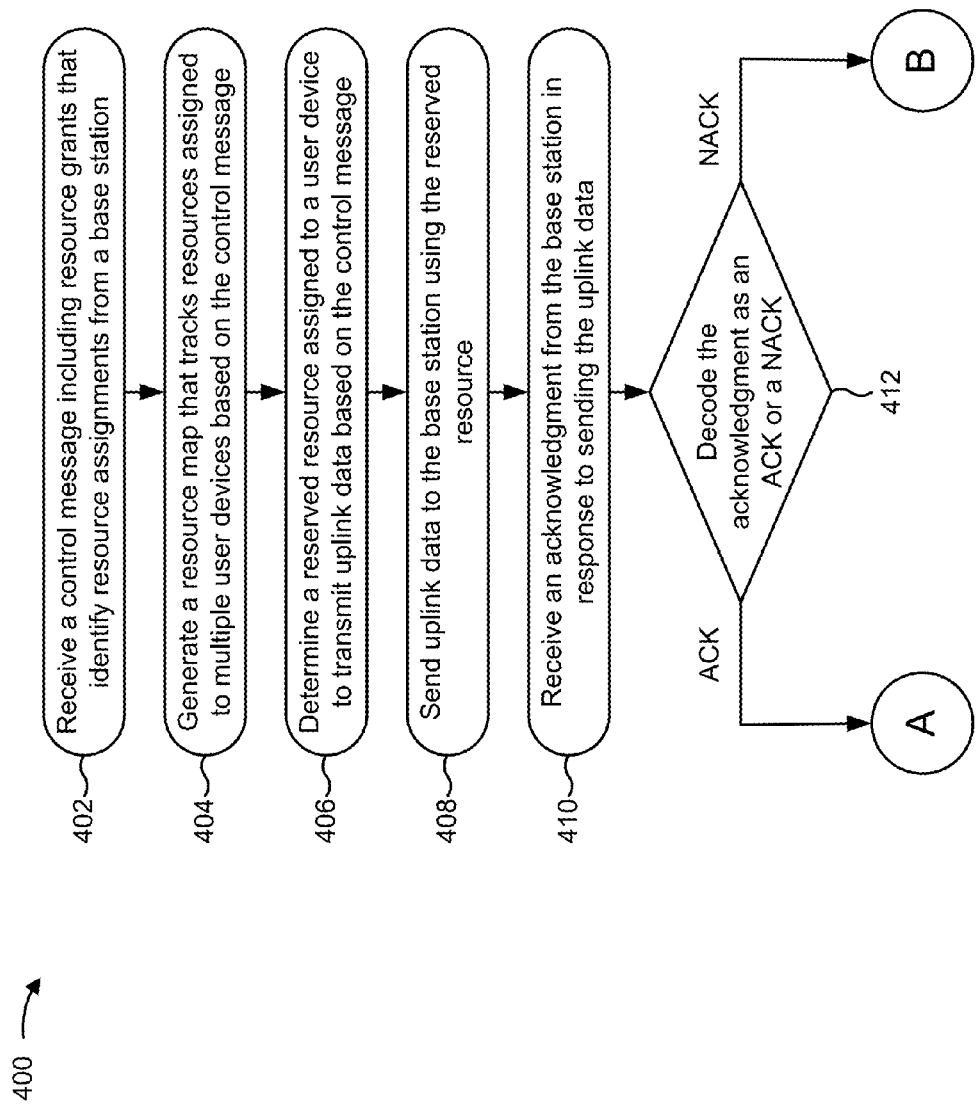
FIGS. 4A-4C are flow charts of an example process for resolving falsely decoded acknowledgments.
Figure 4B:
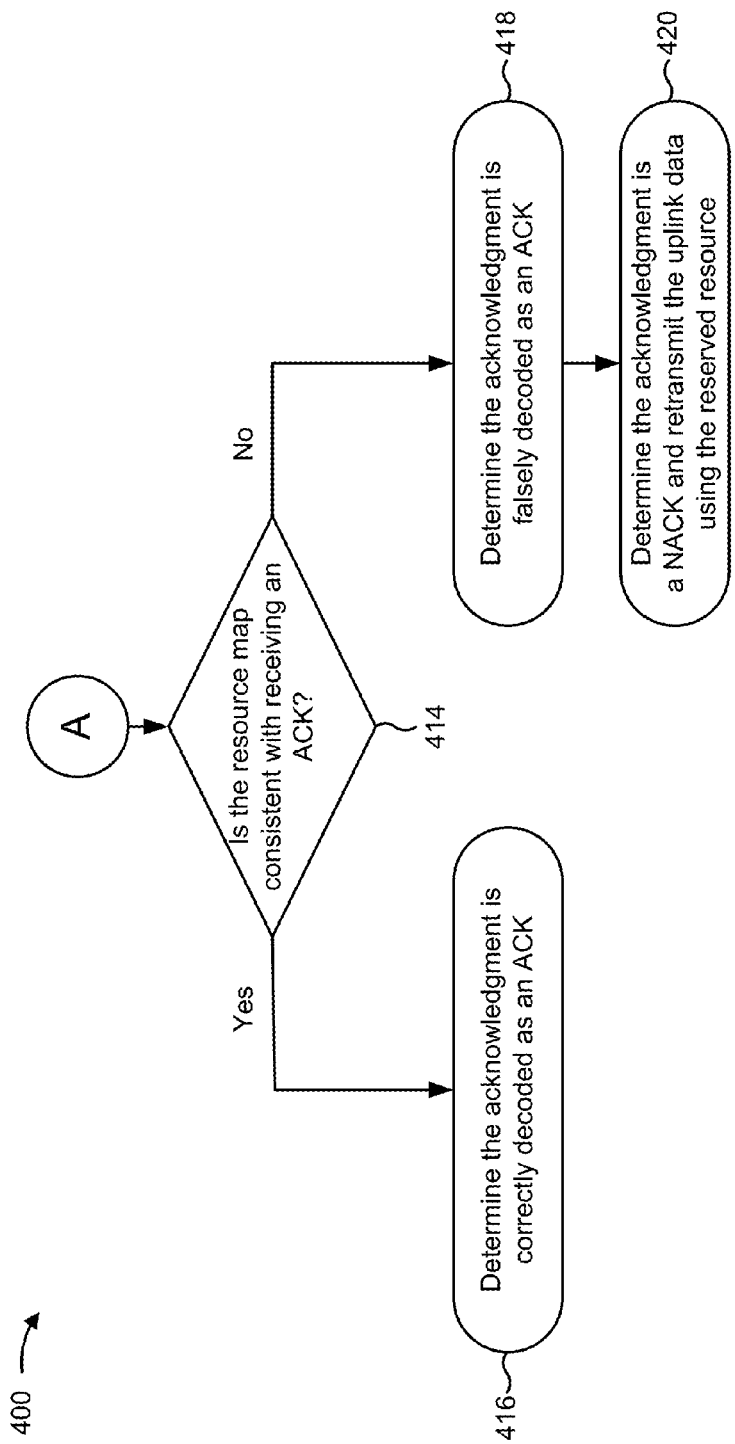
Figure 4C:
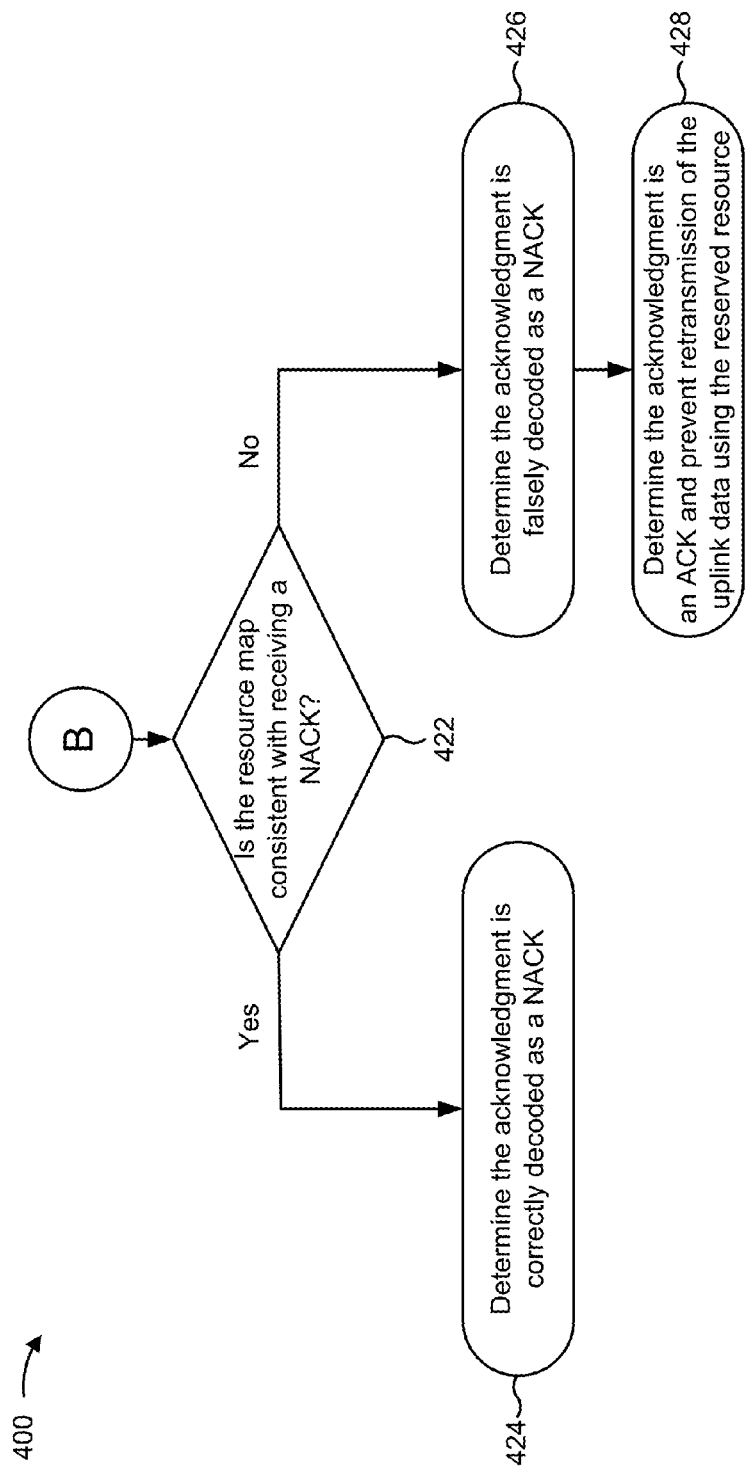

FIGS. 4A-4C are flow charts of an example process 400 for resolving falsely decoded acknowledgments. In some implementations, one or more process blocks of FIGS. 4A-4C may be performed by user device 210. In some implementations, one or more process blocks of FIG. 4A-4C may be performed by another device or a group of devices separate from or including user device 210, such as base station 220.

As shown in FIG. 4A, process 400 may include receiving a control message that includes resource grants that identify resource assignments from a base station (block 402). For example, user device 210 may receive the control message from a base station 220 (e.g., an eNB).

Multiple user devices 210 may establish connections with the same base station 220. For example, user devices 210 may establish an LTE connection with base station 220 for sending information to and/or receiving information from network 230.

Base station 220 may assign resources for each user device 210 to use to communicate with base station 220. For example, base station 220 may schedule a resource to be used by a user device 210 for a particular amount of time. A resource may be a shared channel resource that includes a range of frequencies. Base station 220 may generate a control message that includes one or more resource grants when resources need to be newly assigned to one or more user devices 210. For example, the control message may include a downlink control information (DCI) message that identifies new resource assignments for multiple user devices 210. Each resource grant may identify a resource that is not currently assigned to another user device 210. The control message may only include resource grants for newly assigned resources and may not include resource grants for resources that are to be reused by a user device 210. In other words, if base station 220 is expecting a user device 210 to retransmit uplink data using a same resource identified by a resource grant in a previous control message, base station 220 may not include a resource grant in a new control message for the resource. For example, when base station 220 sends a NACK to a user device 210, base station 220 implicitly grants the user device 210 access to retransmit uplink data using the same resource without having to include a resource grant in a new control message.

Base station 220 may transmit the control message to user devices 210 on a particular channel (e.g., a Downlink Physical Dedicated Control Channel (PDCCH)) and user devices 210 may receive the control message on the particular channel.

Base station 220 may send new control messages, including new resource assignments that indicate newly assigned resources, to user devices 210 throughout process 400 and user devices 210 may receive the new control messages throughout process 400.

As further shown in FIG. 4A, process 400 may include generating a resource map that tracks resources assigned to multiple user devices 210 based on the control message (block 404). For example, user device 210 may generate the resource map based on the resource grants included in the control message. In some implementations, each of the multiple user devices 210 may perform process 400.

The resource map may include information identifying resources assigned to multiple user devices 210 including the user device 210 that generates the resource map. The resource map may indicate past, present, and/or future resources assigned to user devices 210. User device 210 may update the resource map each time a new control message is received. User device 210 may store the resource map in a memory included in user device 210 and/or a memory accessible by user device 210.

In some implementations, each of user devices 210 connected to base station 220 may generate and store a resource map.

As further shown in FIG. 4A, process 400 may include determining a reserved resource assigned to user device 210 to transmit uplink data based on the control message (block 406). For example, user device 210 may determine the reserved resource assigned to user device 210.

The control message may include a resource grant indicating a resource assigned to user device 210. User device 210 may identify the resource assigned to user device 210 based on the control message. The resource assigned to user device 210 (e.g., the user device 210 that generates the resource map) is referred to as a "reserved resource" herein.

As further shown in FIG. 4A, process 400 may include sending uplink data to base station 220 using the reserved resource (block 408). For example, user device 210 may send the uplink data.

The uplink data may include any kind of data that user device 210 sends to network 230 via base station 220 (e.g., voice data, video data, text data, etc.). User device 210 may send the uplink data to base station 220 using the reserved resource assigned to user device 210.

Base station 220 may receive the uplink data sent by user device 210. Base station 220 may attempt to decode the uplink data and generate an acknowledgment indicating whether base station 220 can successfully decode the uplink data. The acknowledgement may be a hybrid automatic repeat request (HARQ). For example, the acknowledgment may include an ACK when base station 220 can successfully decode the uplink data. On the other hand, the acknowledgment may include a NACK when base station 220 cannot successfully decode the uplink data. Base station 220 may send the acknowledgment to user device 210 in response to receiving the uplink data. For example, base station 220 may send the acknowledgment on a particular channel (e.g., a Physical HARQ Indicator Channel (PHICH)).

As further shown in FIG. 4A, process 400 may include receiving the acknowledgment from base station 220 in response to sending the uplink data (block 410). For example, user device 210 may receive the acknowledgment (e.g., a HARQ) on the particular channel (e.g., the PHICH).

As further shown in FIG. 4A, process 400 may include decoding the acknowledgement as an ACK or a NACK (block 412). For example, user device 210 may decode the acknowledgment.

As shown in FIGS. 4A and 4B, when the acknowledgment is decoded as an ACK (block 412—ACK), then process 400 may include determining whether the resource map is consistent with user device 210 receiving an ACK (block 414). For example, user device 210 may determine whether the resource map is consistent with base station 220 sending an ACK to user device 210.

If base station 220 was able to decode the uplink data, the reserved resource may be freed for use and base station 220 may reassign the reserved resource to other user devices 210 because the reserved resource is no longer being used by user device 210. Accordingly, base station 220 may send an ACK in response to user device 210 sending the uplink data. Thus, a new control message sent by base station 220 after an ACK is sent may include a new resource grant for the reserved resource indicating the reserved resource is assigned to another user device 210. Moreover, if user device 210 has more uplink data to transmit, base station 220 may assign a new resource (e.g., a new reserved resource) to user device 210. Accordingly, the new control message, sent by base station 220 after an ACK is sent, may include a new resource grant indicating that a new resource has been assigned to user device 210. In such a case, user device 210 may receive the new control message and update the resource map to indicate that the reserved resource is assigned to another user device 210 and/or a new resource has been assigned to user device 210.

Consequently, if the resource map indicates the reserved resource is assigned to another user device 210 and/or a new resource has been assigned to user device 210, user device 210 may determine the resource map is consistent with base station 220 sending an ACK to user device 210.

On the other hand, if base station 220 was not able to decode the uplink data, the reserved resource may not be freed for use and base station 220 may continue to reserve the reserved resource for user device 210 so that user device 210 may retransmit the uplink data using the reserved resource again. Accordingly, base station 220 may send a NACK in response to user device 210 sending the uplink data. Thus, a new control message sent by base station 220 after a NACK is sent by base station 220 may not include a new resource grant for the reserved resource. In such a case, user device 210 may receive the new control message, but the user device 210 may not update the resource map to indicate that the reserved resource is assigned to another user device 210 because the reserved resource has not been assigned to another user device 210 by base station 220.

Consequently, if the resource map indicates the reserved resource has not been reassigned to another user device 210, user device 210 may determine the resource map is not consistent with base station 220 sending an ACK to user device 210 as user device 210 decoded.

However, just because the reserved resource has not been reassigned to another user device 210 does not necessarily mean that base station 220 actually sent a NACK and is still reserving the reserved resource for user device 210. For example, base station 220 may have actually sent an ACK and just not had the opportunity to reassign the reserved resource to another user device 210 yet (e.g., due to lack of demand for resources from other user devices 210).

Accordingly, user device 210 may determine whether the reserved resource is still reserved for user device 210 or has merely not been reassigned yet based on which other resources have been assigned to other user devices 210. For example, if resources including frequencies directly above and/or directly below the frequencies included in the reserved resource have been assigned to other user devices 210, user device 210 may determine that base station 220 skipped over the reserved resource when assigning new resources. Thus, user device 210 may deduce that the reserved resource is still reserved for user device 210, that base station 220 actually sent a NACK, and that user device 210 falsely decoded the acknowledgment as an ACK.

In other words, if the resource map indicates a gap in newly assigned resources where the reserved resource should have been, user device 210 may determine the resource map is not consistent with base station 220 sending an ACK to user device 210 as user device 210 decoded.

On the other hand, if the resource map indicates there is not a gap in newly assigned resources where the reserved resource should have been, user device 210 may determine the resource map is consistent with base station 220 sending an ACK to user device 210 as user device 210 decoded.

As further shown in FIG. 4B, when user device 210 determines the resource map is consistent with user device 210 receiving an ACK (block 414—yes), process 400 may include determining the acknowledgment is correctly decoded as an ACK (block 416). For example, user device 210 may confirm that the acknowledgment is correctly decoded as an ACK based on the resource map.

Accordingly, user device 210 may treat the acknowledgment as an ACK. For example, if the new control message includes a new resource grant indicating a new resource is assigned to user device 210, user device 210 may send new uplink data to base station 220 using the new resource. Additionally, or alternatively, user device 210 may wait for a new control message to be received and repeat process 400 by returning to block 402.

As further shown in FIG. 4B, when user device 210 determines the resource map is not consistent with user device 210 receiving an ACK (block 414—no), process 400 may include determining the acknowledgment is falsely decoded as an ACK (block 418). For example, user device 210 may determine the acknowledgment is falsely decoded as an ACK based on the resource map indicating the reserved resource has not been reassigned to another user device 210 and/or indicating a gap in newly assigned resources where the reserved resource should have been.

As further shown in FIG. 4B, process 400 may include determining the acknowledgment is a NACK and retransmitting the uplink data using the reserved resource (block 420). For example, user device 210 may determine the acknowledgment is a NACK and retransmit the uplink data.

User device 210 may determine that base station 220 was not able to properly decode the uplink data. Consequently, user device 210 may determine that base station 220 has granted an implicit grant for retransmission of the uplink data using the reserved resource based on the acknowledgment being determined to be a NACK. Accordingly, user device 210 may retransmit the uplink data to base station 220 using the reserved resource.

Thus, even though user device 210 falsely decoded a NACK as an ACK, user device 210 may still retransmit the uplink data using the reserved resource. Accordingly, user device 210 uses the reserved resource and the reserved resource is not wasted by base station 220 waiting for a retransmission of the uplink data that never comes. Moreover, the uplink data may be properly communicated instead of base station 220 not receiving a retransmission of the uplink data that can be properly decoded and communicated.

Base station 220 may receive the retransmitted uplink data and transmit a new acknowledgment to user device 210 in response to receiving the retransmitted uplink data. User device 210 may return to block 410 of process 400 and wait for the new acknowledgment sent from base station 220.

As shown in FIGS. 4A and 4C, when the acknowledgment is decoded as a NACK (block 412—NACK), process 400 may include determining whether the resource map is consistent with user device 210 receiving a NACK (block 422). For example, user device 210 may determine whether the resource map is consistent with base station 220 sending a NACK to user device 210.

If base station 220 was able to decode the uplink data, the reserved resource may be freed for use and base station 220 may reassign the reserved resource to another user device 210 because the reserved resource is no longer being used by user device 210. Accordingly, base station 220 may send an ACK in response to user device 210 sending the uplink data. Thus, a new control message sent by base station 220 after the ACK was sent may include a new resource grant for the reserved resource indicating the reserved resource is assigned to another user device 210. Moreover, if user device 210 has more uplink data to transmit, base station 220 may assign a new resource (e.g., a new reserved resource) to user device 210. Accordingly, the new control message sent by base station 220 after the ACK was sent may include a new resource grant indicating that a new resource has been assigned to user device 210. User device 210 may receive the new control message and update the resource map to indicate that the reserved resource is assigned to another user device 210 and/or a new resource has been assigned to user device 210.

Accordingly, if the resource map indicates the reserved resource is assigned to another user device 210 and/or a new resource has been assigned to user device 210, user device 210 may determine that the resource map is consistent with user device 210 receiving a NACK.

On the other hand, if the resource map indicates the reserved resource is not assigned to another user device 210 and/or a new resource has not been assigned to user device 210, user device 210 may determine that the resource map is consistent with user device 210 receiving a NACK.

As further shown in FIG. 4C, when user device 210 determines the resource map is consistent with user device 210 receiving a NACK (block 422—yes), process 400 may include determining the acknowledgment is correctly decoded as a NACK (block 424). For example, user device 210 may determine that the acknowledgment is correctly decoded as a NACK.

Accordingly, user device 210 may treat the acknowledgment as a NACK. For example, user device 210 may determine that base station 220 was not able to properly decode the uplink data and that base station 220 has granted an implicit grant for retransmission. Thus, user device 210 may retransmit the uplink data to base station 220 using the reserved resource.

Base station 220 may receive the retransmitted uplink data and transmit a new acknowledgment to user device 210 in response to receiving the retransmitted uplink data. User device 210 may return to block 410 of process 400 and wait for the new acknowledgment sent from base station 220.

As further shown in FIG. 4C, when user determines the resource map is not consistent with user device 210 receiving a NACK (block 422—no), process 400 may include determining the acknowledgment is falsely decoded as a NACK (block 426). For example, user device 210 may determine the acknowledgment is falsely decoded as a NACK based on the resource map indicating the reserved resource has been reassigned to another user device 210 and/or a new resource has been assigned to user device 210.

As further shown in FIG. 4C, process 400 may include determining the acknowledgment is an ACK and preventing retransmission of the uplink data using the reserved resource (block 428). For example, user device 210 may determine the acknowledgment is an ACK and prevent retransmission of the uplink data.

User device 210 may determine that base station 220 was able to properly decode the uplink data and that retransmission of the uplink data using the reserved resource is unnecessary (and unauthorized) based on the acknowledgement being determined to be an ACK. Thus, user device 210 may prevent retransmission of the uplink data using the reserved resource even though the acknowledgment was decoded as a NACK. In some implementations, user device 210 may allow a threshold number of retransmissions of the uplink data before preventing future retransmissions of the uplink data.

Accordingly, uplink transmission collision may be avoided by user device 210 not retransmitting the uplink data using the reserved resource. Thus, the reserved resource is not wasted by the uplink transmission collision preventing base station 220 from properly decoding the other uplink data.

If the resource map indicates a new resource has been assigned to user device 210, user device 210 may transmit new uplink data to base station 220 using the new resource.

Additionally, or alternatively, user device 210 may wait for a new control message to be received and repeat process 400 by returning to block 402.

In some implementations, user device 210 may only attempt to resolve a falsely decoded acknowledgment or actually resolve a falsely decoded acknowledgment in certain situations. In other words, user device 210 may only check whether an ACK or a NACK is received based on the resource map (e.g., blocks 414 and/or 422) and/or determine the acknowledgment was falsely decoded (e.g., blocks 418 and/or 426) when certain factors are satisfied.

For example, user device 210 may resolve a falsely decoded acknowledgement based on an interference level measured by user device 210 satisfying a threshold value. For instance, user device 210 may only resolve a falsely decoded acknowledgment when the interference level is above a threshold value because user device 210 is more likely to make a decoding error when the interference level is above the threshold value than when the interference level is below the threshold value. Likewise, user device 210 may only resolve a falsely decoded acknowledgment when a RF variation satisfies a threshold value, a Block Error Rate (BLER) satisfies a threshold value, and/or a sector loading value satisfies a threshold value.

Additionally, or alternatively, user device 210 may only actually resolve a falsely decoded acknowledgment after a threshold number of falsely decoded acknowledgments are detected in a row and/or within a particular amount of time.

Although FIGS. 4A-4C show example blocks of process 400, in some implementations, process 400 may include additional blocks, fewer blocks, different blocks, or differently arranged blocks than those depicted in FIGS. 4A-4C. Additionally, or alternatively, two or more of the blocks of process 400 may be performed in parallel.

Figure 5A:
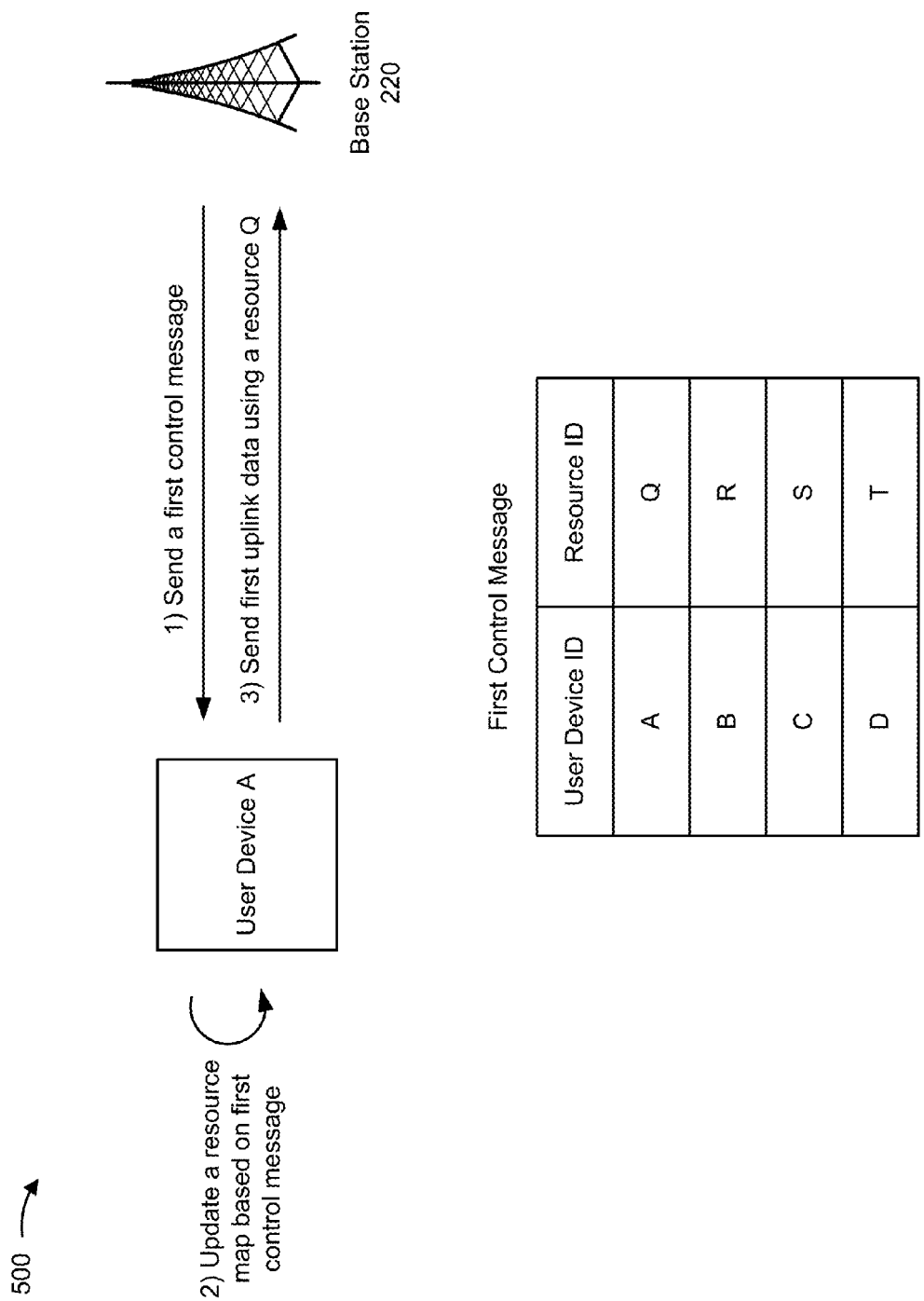
FIGS. 5A-5C are diagrams of an example implementation relating to the example process shown in FIGS. 4A-4C.
Figure 5B:
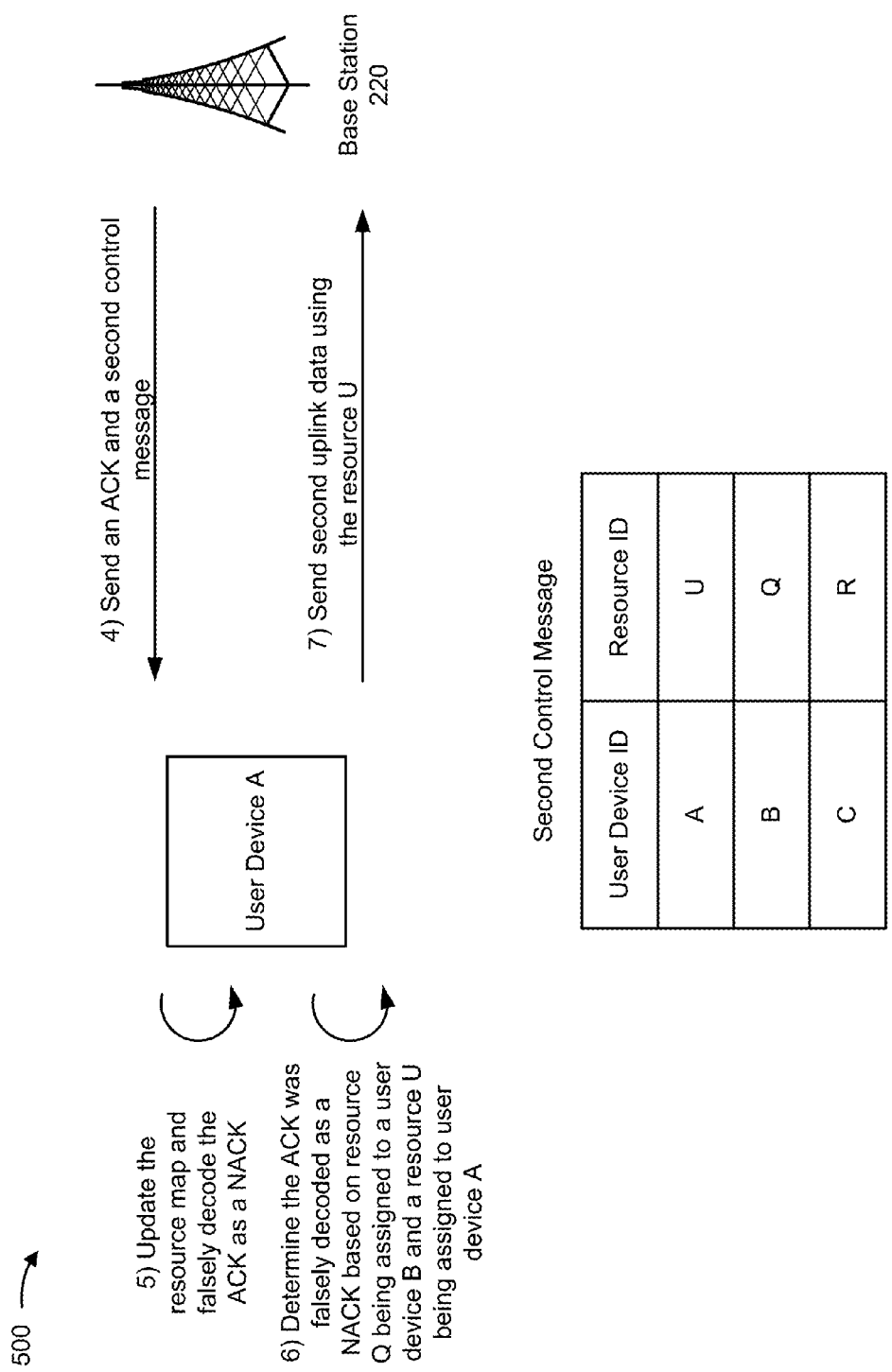
Figure 5C:
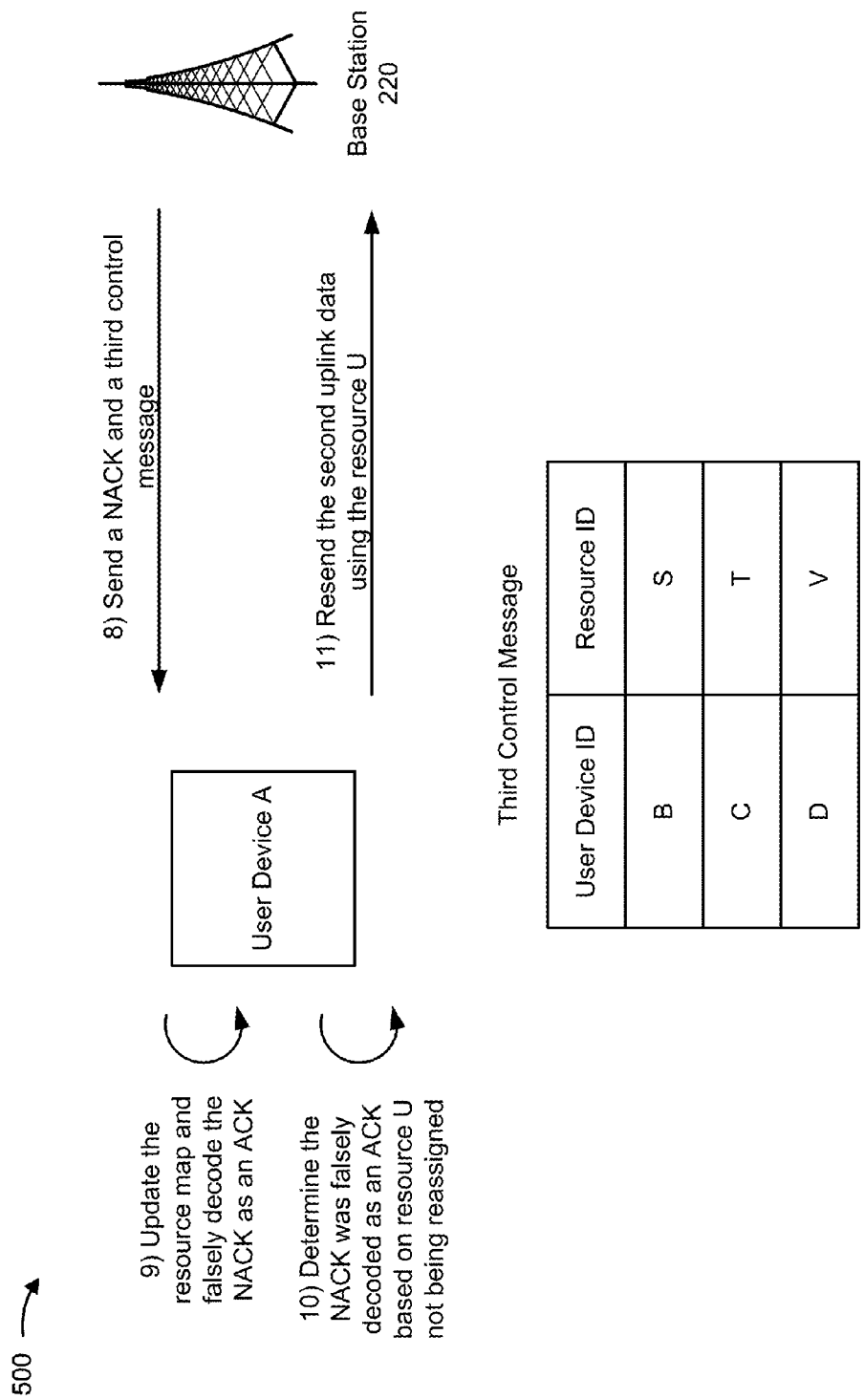

FIGS. 5A-5C are diagrams of an example implementation 500 relating to example process 400 shown in FIG. 4. FIGS. 5A-5C show an example of resolving falsely decoded acknowledgments.

In example implementation 500, assume base station 220 sends a first control message to user devices A, B, C, and D (e.g., user devices 210) via a PDCCH. The control message may include resource grants indicating new resource assignments for user devices A, B, C, and D. For example, as shown in FIG. 5A, the first control message may indicate that resource Q is assigned to user device A, resource R is assigned to user device B, resource S is assigned to user device C, and resource T is assigned to user device D.

As further shown in FIG. 5A, user device A may receive the first control message and update a resource map based on the first control message to indicate the new resource assignments. User device A may determine that resource Q has been assigned to user device A based on the first control message. User device A may send first uplink data to base station 220 using resource Q. Base station 220 may receive the first uplink data via resource Q and start to decode the first uplink data.

In FIG. 5B, assume base station 220 is able to properly decode the first uplink data and generates an acknowledgment, indicating an ACK, to be sent to user device A based on properly decoding the first uplink data. Accordingly, because the first uplink data was properly decoded, resource Q is freed to be reassigned to another user device 210.

Further, assume base station 220 assigns new resources to user devices A, B, and C, and generates a second control message indicating the new resource assignments. Assume a new resource is not assigned to user device D (e.g., because user device D received a NACK and needs to retransmit using resource T and/or because user device D has no uplink data to send). For example, as shown in FIG. 5B, the second control message may indicate the resource U is newly assigned to user device A, the resource Q is newly assigned to user device B, and the resource R is newly assigned to user device C. Thus, user device A has been newly assigned resource U and resource Q has been reassigned to user device B. Base station 220 may send the second control message to user devices A, B, C, and D via the PDCCH and the ACK to user device A via a PHICH.

User device A may receive the acknowledgement, indicating an ACK, and receive the second control message. User device A may update the resource map based on the second control message to indicate the new resource assignments.

Assume user device A falsely decodes the ACK as a NACK. User device A may check whether the resource map indicates a NACK was received to confirm a decoding error was not made. User device A may determine that a new resource (e.g., resource U) is assigned to user device A and that the previously assigned resource (e.g., resource Q) is assigned to a different user device 210 (e.g., user device B) based on checking the resource map. Base station 220 would not have assigned a new resource (e.g., resource U) to user device A nor reassigned the previous resource (e.g., resource Q) to a different user device 210 if base station 220 had sent a NACK. Rather, base station 220 would be expecting a retransmission of the first uplink data via resource Q if base station 220 had not properly decoded the first uplink data. Accordingly, user device A may determine that user device A falsely decoded the acknowledgment as a NACK and that the acknowledgment actually indicates an ACK.

As further shown in FIG. 5B, user device A may send second uplink data to base station 220 using resource U based on determining the acknowledgment indicates an ACK and based on the second control message assigning resource U to user device A. Base station 220 may receive the second uplink data via resource U and start to decode the second uplink data.

In FIG. 5C, assume base station 220 is not able to properly decode the second uplink data and generates an acknowledgment, indicating a NACK, to be sent to user device A based on not properly decoding the second uplink data. Accordingly, because the second uplink data was not properly decoded, resource Q is not freed to be reassigned to another user device 210.

Further, assume base station 220 assigns new resources to user devices B, C, and D and generates a third control message with new resource assignments. Assume a new resource is not assigned to user device A because base station 220 implicitly grants user device A permission to retransmit the second uplink data using resource Q based on the NACK. As shown in FIG. 5C, the third control message may indicate the resource S is newly assigned to user device B, the resource T is newly assigned to user device C, and the resource V is newly assigned to user device D. Base station 220 may send the third control message to user devices A, B, C, and D via the PDCCH and the NACK to user device A via the PHICH.

User device A may receive the acknowledgement, indicating the NACK, and receive the third control message. User device A may update the resource map based on the third control message to indicate the new resource assignments.

Assume user device A falsely decodes the NACK as an ACK. User device A may check whether the resource map indicates an ACK was received to confirm a decoding error was not made. User device A may determine that resource U was not reassigned to another user device 210 and that there is gap in the newly assigned resources between resources T and V based on checking the resource map. In other words, user device A may determine that base station 220 skipped over assigning resource U as a newly assigned resource and instead went from assigning resource T to assigning resource V. Base station 220 most likely would have assigned resource U before assigning resource V if resource U was free to be reassigned. Accordingly, user device A may determine that resource U was not free to be reassigned because the second uplink data sent using resource U was not properly decoded. In other words, user device A may determine that the acknowledgment is falsely decoded as an ACK and actually indicates a NACK.

Thus, user device A may determine base station 220 implicitly granted user device A permission to retransmit the second uplink data using resource U even though user device A decoded the acknowledgment as an ACK. As shown in FIG. 5C, user device A may resend the second uplink data using resource U.

In this way, user device A may resolve falsely decoded acknowledgments sent by base station 220. For example, user device A may treat a falsely decoded ACK as a NACK or treat a falsely decoded NACK as an ACK.

As indicated above, FIGS. 5A-5C are provided merely as an example. Other examples are possible and may differ from what was described with regard to FIGS. 5A-5C.

Implementations described herein may resolve falsely decoded acknowledgments so that user device 210 acts as base station 220 intended even though user device 210 falsely decoded an acknowledgment sent by base station 220. Additionally, or alternatively, implementations described herein may prevent resources from being wasted due to user device 210 falsely decoding an acknowledgment sent by base station 220.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first user device, comprising:
   a processor; and
   a memory storing instructions that, when executed by the processor, cause the processor to:
   transmit, by the first user device, uplink data to a base station using a resource;
   receive, by the first user device, an acknowledgment from the base station based on the uplink data,
   the acknowledgment indicating a positive acknowledgment or a negative acknowledgment;
   decode, by the first user device, the acknowledgment as the positive acknowledgment or the negative acknowledgment;
   receive, by the first user device, a control message from the base station indicating resource assignments for a plurality of user devices;
   determine, by the first user device, the acknowledgment is falsely decoded as the positive acknowledgment or the negative acknowledgment based on the resource assignments,
   the acknowledgment being falsely decoded as the negative acknowledgment when the control message indicates that the resource, used by the first user device in a previous uplink transmission, has been reassigned to a second user device,
   the plurality of user devices including the first user device and the second user device, and
   the acknowledgement being falsely decoded as the positive acknowledgment when the control message indicates the resource, used by the first user device in the previous uplink transmission, is still assigned to the first user device; and
   selectively retransmit, by the first user device, the uplink data to the base station using the resource based on whether the acknowledgment is falsely decoded as the positive acknowledgment or the negative acknowledgment,
   the uplink data being retransmitted to the base station using the resource when the acknowledgment is falsely decoded as the positive acknowledgment, or
   the uplink data not being retransmitted to the base station using the resource when the acknowledgment is falsely decoded as the negative acknowledgment.

2. The first user device of claim 1, where the instructions, when determining the acknowledgment was falsely decoded, cause the processor to:
   determine the acknowledgment is not consistent with a resource map, the resource map indicating the resource assignments for the plurality of user devices, and determine the acknowledgment was falsely decoded based on the acknowledgment not being consistent with the resource map.

3. The first user device of claim 1, where the control message is a new control message and the resource assignments are new resource assignments;

where the instructions, when executed by the processor, further cause the processor to:
receive an original control message from the base station indicating original resource assignments for the plurality of user devices,
the original control message being received prior to the new control message, and
the original resource assignments indicating the first user device is assigned the resource to use to communicate with the base station; and where the instructions, when transmitting the uplink data to the base station using the resource, cause the processor to:
transmit the uplink data to the base station using the resource based on the original resource assignments indicated in the original control message.

4. The first user device of claim 1, where the control message is a new control message and the resource assignments are new resource assignments, and where the instructions, when executed by the processor, further cause the processor to:
receive an original control message from the base station indicating original resource assignments for the plurality of user devices,
the original control message being received prior to the new control message,
generate a resource map indicating the new resource assignments and the original resource assignments; and
determine the acknowledgement is falsely decoded based on the resource map.

5. The first user device of claim 1, where the resource assignments indicate assigned resources and respective ones of the plurality of user devices that may use the assigned resources.

6. The first user device of claim 1, where the instructions, when executed by the processor, further cause the processor to:
update a resource map to indicate that the resource is assigned to another user device when decoding the acknowledgment as the positive acknowledgment, or
maintain the resource map to indicate that the resource is assigned to the first user device when decoding the acknowledgment as the negative acknowledgment.

7. The first user device of claim 1, where the instructions, when determining the acknowledgment is falsely decoded as the positive acknowledgment, cause the processor to:
determine a set of resources, at frequencies directly above and directly below a frequency of the resource, have been assigned to other user devices.

8. A computer-readable medium storing instructions, the instructions comprising:
one or more instructions that, when executed by one or more processors of a first user device, cause the one or more processors to:
send, by the first user device, uplink data to a base station using a resource;
receive, by the first user device, an acknowledgment from the base station based on sending the uplink data, the acknowledgment including:
a positive acknowledgment that indicates the base station properly decoded the uplink data, or
a negative acknowledgment that indicates the base station did not properly decode the uplink data;
decode, by the first user device, the acknowledgment as the positive acknowledgment or the negative acknowledgment;
receive, by the first user device, a control message from the base station indicating resource assignments for a plurality of user devices;
determine, by the first user device, the acknowledgement is falsely decoded as the positive acknowledgment or the negative acknowledgment based on the resource assignments,
the acknowledgment being falsely decoded as the negative acknowledgment when the control message indicates that the resource, used by the first user device in a previous uplink transmission, has been reassigned to a second user device,
the plurality of user devices including the first user device and the second user device, and
the acknowledgment being falsely decoded as the positive acknowledgment when the control message indicates the resource, used by the first user device in the previous uplink transmission, is still assigned to the first user device; and
prevent, by the first user device, resending of the uplink data using the resource based on determining the acknowledgment is falsely decoded as the negative acknowledgment.

9. The computer-readable medium of claim 8, where the one or more instructions, when determining the acknowledgment is falsely decoded, cause the one or more processors to:
determine the acknowledgment is not consistent with a resource map.

10. The computer-readable medium of claim 8, where the one or more instructions, when executed by the one or more processors, further cause the one or more processors to:
update a resource map to indicate that the resource is assigned to another user device when decoding the acknowledgment as the positive acknowledgment, or
maintain the resource map to indicate that the resource is assigned to the first user device when decoding the acknowledgment as the negative acknowledgment.

11. The computer-readable medium of claim 10, where the one or more instructions, when executed by the one or more processors, further cause the one or more processors to:
send new uplink data to the base station using a second resource when the acknowledgment is decoded as the negative acknowledgment.

12. The computer-readable medium of claim 8, where the one or more instructions, when preventing the resending of the uplink data, cause the one or more processors to:
prevent resending the uplink data based on a threshold number of acknowledgments being determined to be falsely decoded.

13. The computer-readable medium of claim 8, where the one or more instructions, when preventing the resending of the uplink data, cause the one or more processors to:
prevent resending the uplink data based on a threshold number of acknowledgments being determined to be falsely decoded in a particular time period.

14. The computer-readable medium of claim 8, where the one or more instructions, when executed by the one or more processors, further cause the one or more processors to:
  resend the uplink data using the resource at least one time before preventing resending of the uplink data based on determining the acknowledgment is falsely decoded as the negative acknowledgment.

15. A method, comprising:
  transmitting, by a first user device, uplink data to a base station using a resource;
  receiving, by the first user device, an acknowledgment from the base station based on sending the uplink data, the acknowledgment including:
    a positive acknowledgment that indicates the base station properly decoded the uplink data, or
    a negative acknowledgment that indicates the base station could not properly decode the uplink data;
  decoding, by the first user device, the acknowledgment as the positive acknowledgment or the negative acknowledgment;
  receiving, by the first user device, a control message from the base station indicating resource assignments for a plurality of user devices;
  determining, by the first user device, the acknowledgement is falsely decoded as the positive acknowledgment or the negative acknowledgment based on the resource assignments,
    the acknowledgment being falsely decoded as the negative acknowledgment when the control message indicates that the resource, used by the first user device in a previous uplink transmission, has been reassigned to a second user device,
      the plurality of user devices including the first user device and the second user device, and
    the acknowledgment being falsely decoded as the positive acknowledgment when the control message indicates the resource, used by the first user device in the previous uplink transmission, is still assigned to the first user device; and
  retransmitting, by the first user device, the uplink data using the resource based on determining the acknowledgment is falsely decoded as the positive acknowledgment.

16. The method of claim 15, where the resource assignments indicate that the resource has not been reassigned to any of the plurality of user devices, and
  where determining the acknowledgment is falsely decoded includes:
    determining the acknowledgment is falsely decoded as the positive acknowledgement based on the resource not being assigned to any of the plurality of user devices.

17. The method of claim 15, further comprising:
  determining a gap in newly assigned resources where the base station would have reassigned the resource based on the resource assignments; and
  where determining the acknowledgment is falsely decoded includes:
    determining the acknowledgment is falsely decoded as the positive acknowledgement based on gap in the newly assigned resources.

18. The method of claim 15, where determining the acknowledgment is falsely decoded includes:
  determining that a radio frequency variation, associated with the first user device, satisfies a threshold value; and
  determining the acknowledgment is falsely decoded based on the radio frequency variation satisfying the threshold value.

19. The method of claim 15, where determining the acknowledgment is falsely decoded includes:
  determining that an interference level, associated with the first user device, satisfies a threshold value; and
  determining the acknowledgment is falsely decoded based on the interference level satisfying the threshold value.

20. The method of claim 15, where determining the acknowledgment is falsely decoded includes:
  determining that a Block Error Rate, associated with the first user device, satisfies a threshold value; and
  determining the acknowledgment is falsely decoded based on the Block Error Rate satisfying the threshold value.

* * * * *